Patented Oct. 22, 1940

2,218,710

UNITED STATES PATENT OFFICE 2,218,710

MANUFACTURE OF STIFFENING BANDAGES AND STIFFENING BANDAGES COMMERCIAL PRODUCTS

Willy O. Herrmann, Deisenhofen, and Bernd Braun, Melsungen, District of Kassel, Germany, assignors to Chemische Forschungsgesellschaft, m. b. H., Munich, Germany, a corporation of Germany No Drawing. Application May 13, 1937, Serial No. 142,516. In Germany May 16, 1936

4 Claims. (Cl. 128—91)

The present invention relates to improved stiffening bandages and their manufacture. An object of the invention is to provide an improvement upon the usual gypsum bandages and lighter bandages containing light pigments such as magnesia, etc. Another object is to provide bandages consisting entirely of light organic substances but having nevertheless a sufficient stiffening action.

Up to now it has been an unsolved problem to apply stiffening and hardening inorganic fillers, especially pigments, to bandage materials in a satisfactory manner so as not to give off dust, and to be durable, capable of being stored, and particularly to be unalterable by atmospheric and climatic influences, etc. Heretofore even gypsum bandages manufactured with an addition of cellulose acetate have not been satisfactory. Though a better superficial adhesion of gypsum, etc. is achieved by the addition of cellulose acetate, there still remains the fundamental trouble of the applied pigment giving off dust and crumbling off, the instability towards the humidity of the air etc. Above all even the improved gypsum-bandage shows the general property, so characteristic up to now with all gypsum bandages, of being very disagreeable and dirty to handle when softened for use.

We have found a way of impregnating or coating bandage material not only with solid substances such as pigments to make them durable, capable of being stored, and particularly suitable for the tropics, but of making the method of applying such bandage materials at the same time considerably more convenient and above all cleaner. This is achieved by mixing the solids with an agent serving as a binding material, adhesive subtsance, protective coating and at the same time as a stiffening agent which simultaneously favors the supplementary homogenization and stiffening of the bandage, but which above all makes clean working possible when softening it before use or during the dressing operation itself. The application of such a binding material also makes it possible to dispense entirely with the addition of inorganic stiffening and hardening fillers such as gypsum or magnesia, etc., and thus to provide quite novel and especially light stiffening bandages.

The water insoluble polymerized vinyl compounds are suitable as such binding, adhesive, coating and stiffening agents, provided they possess sufficient stiffening power. These requirements are met with by all polyvinyl compounds, particularly by the esters, acetals and ester acetals of polyvinyl alcohols, but also by polystyrols and the like the flexibility of which is not as great as that of the esters of polymerized acrylic and methacrylic acid.

All of these proportionately less flexible polyvinyl compounds are more or less excellent adhesive, coating, protective, and stiffening agents, and in view of the multitude of varieties known even today they offer a rich choice for special purposes. There is, for example, the easily soluble, brittle, but readily filling low-polymeric vinyl acetate, and on the other hand the difficultly soluble, but viscous and nervy high-polymeric product. There are also other polyvinyl esters with step-wise modified properties, and particularly hard polyvinyl formaldehyde acetals as well as ester acetals, including viscous polyvinyl chlorides, poly-styrols, etc.

Cellulose compounds such as cellulose acetate or nitro-cellulose and other suitable additions may be used mixed with the polyvinyl compounds; e. g. by combining polyvinyl esters and cellulose esters even the adhesive and filling power of the elementary body may be favorably utilized with the hardening and stiffening action. This is particularly advantageous for such bandage material where the necessary softening before use is effected by means of an organic solvent which for example, dissolves the polyvinyl compounds and allows its adhesive action to be utilized, whilst it leaves the cellulose ester portion without being dissolved and maintains its existing stiffening action. Another possibility of modification consists in admixing hydrophilic polyvinyl compounds, which swell or dissolve in water, with the water insoluble ones. Suitable compounds of this kind are, for example, polyvinyl esters of a particularly low degree of polymerization, partly saponified esters and ester acetals of polyvinyl alcohol, and free polyvinyl alcohols of various degrees of polymerization. If desired, the relative rigidity of the stiffening polyvinyl compounds may also be adapted exactly to the purpose in view by admixing highly flexible polyvinyl compounds such as polymerized acrylic or methacrylic acid or derivatives of such acids or substances from the class of the natural or artificial types of caoutchouc, and the like. Furthermore the action of the stiffening polyvinyl compounds or their combinations with additional substances may be modified conveniently by adding softening agents.

*Example 1*

A muslin bandage was impregnated on both sides with a 40% solution of polyvinyl alcohol acetaldehyde acetal in 96% alcohol. The dried bandage can be softened by a short immersion into ether or some other organic softening agent, and can then be wound neatly. After a short time the bandage has become hard and stiff.

If need be, such a stiffening bandage may be made to come off subsequently by using a corresponding softening agent or solvent.

Example 2

1600 cc. of a 40% solution of polyvinyl alcohol acetaldehyde acetal in 96% alcohol were intimately mixed with 150 grams of finely pulverized magnesia. A muslin bandage impregnated with this mixture on both sides produced a stiffening bandage having properties similar to those described in Example 1, but it showed greater hardness and resistance.

Example 3

1000 cc. of 14% solution by weight of polyvinyl alcohol formaldehyde acetal in a mixture of solvent of dichlor ethylene and ethyl-alcohol are formed into paste with 1000 grams of calcined gypsum. This paste is applied to a bandage-fabric, for example muslin bandage. The dried bandage is softened by short immersion into dichlorethylene and made ready for winding up into a stiffening bandage.

Example 4

A dissolution of 500 grams of medium-viscous polyvinyl acetate in 500 grams of 96% methylated spirit is intimately mixed with 1250 grams of finely pulverized calcined gypsum. This mixture is applied to a muslin bandage on one or both sides in a suitable manner and in a suitable thickness. The bandage impregnated in this manner is then dried.

It may still be coated with an additional coat, such as of polyvinyl acetate itself, partially saponified polyvinyl acetate or polyvinyl alcohol, for the purpose of rendering it particularly resistant to tropical conditions. This bandage may be softened by short immersion in hot water and made ready for winding. A stiffening bandage is obtained which hardens after a short time.

The strengthening and supporting action of the polyvinyl compounds make it possible to use paper fabrics instead of fibrous fabrics. Thus, for example, the pigment coating mentioned in Example 4 may be used for impregnating paper bandages.

A suitable method for the manufacture of light bandages containing sufficient stiffening magnesia, is as follows:

The selected bandaging material of textile fabric, metal fabric, paper or the like, by itself or in combination with one another, is coated on one or both sides or impregnated in a suitable manner with an adequate solution of a polyvinyl compound serving by itself or in combination with another adhesive, as an adhesive, protective and stiffening medium. As solutions for this coating or impregnating there may be used, for instance, a 20-50% solution of polyvinyl acetate in alcohol of a 10-30% solution of polyvinyl alcohol formaldehyde acetal in a solvent mixture of dichlorethylene and ethyl alcohol. The bandaging material thus coated or impregnated is then drawn preferably through a suspension or a batch of the desired pigment, e. g. a batch of magnesia in a suitable organic liquid, preferably one which dissolves or swells up the adhesive. If the adhesive consists of polyvinyl acetate, then for example alcohols, esters, ketones, aromatic hydrocarbons may be employed as solvents or swelling media. If polyvinyl acetal is used as adhesive, then mixtures of chloro hydrocarbons and alcohols may be used to advantage.

The adhesive substances may be influenced with regard to adhesive power and flexibility by suitable additions particularly of softeners, by suitable treatment such as by polymerization in the presence of certain additions or solvents for instance according to U. S. A. Patent 1,784,008, or they may be favored by pigmentation, with an additional pigment in their adhesive power, or enlargement of the adhesive surface.

Example 5

A solution obtained according to U. S. A. Patent 1,784,008 by polymerization of vinyl acetate in the presence of methylated spirit is adjusted to 20% solid content of polyvinyl acetate. Through this solution a 17 thread muslin bandage of 8 cm. width is drawn with such a speed, and the coating is adjusted by rubber rollers in such a way, that for example 2-4 grams of solid polyvinyl acetate are applied per metre on the bandage. The moist bandage coated with the above described solution of the adhesive substance is conveniently drawn through a chamber, any possibility of evaporization having been eliminated, in which chamber there is a paste of 300 grams of gypsum in 125 cc. methanol. The outlet orifice of this chamber is regulated in such a manner that the finished dry bandage shows a total pigment of 35-45 grams per metre. The bandage coming out of the coating box is dried conveniently in a canal, drying box or by means of any other suitable device, when the solvent-mixture consisting of spirit and methanol may be recovered, and the bandage wound up, and, if necessary, subdivided immediately to the desired length.

By increasing the concentration of the adhesive solution or the quantity of polyvinyl acetate applied to the bandage, such quantity being regulated for instance by a rubber scraper or in some other suitable manner, the stiffening of the fabric may be influenced, that is, increased or modified qualitatively at will. Furthermore, the quantity of the pigment to be applied may be regulated.

To the solution of the adhesive substance may be added among other things a conveniently porous body or surface-active substance as a pigment for the purpose of improving the adhesion and drying process as well as the degree of stiffness and other properties of the adhesive solution. Thus in the present example instead of employing the polyvinyl acetate methylated spirit solution, a 15% polyvinyl acetate solution in methanol may be mixed with 3-5% infusorial earth and applied.

Instead of a suspension of the pigment in methanol, methylene chloride or the like, or in a mixture of such suitable solvents, particularly solvents favoring the suspension of the pigments or containing emulsifying additions, the fabrics, conveniently coated or impregnated with adhesive substances may be drawn, whilst still sticky, through the dry pigment itself that is, through magnesia or gypsum in a suitable manner. By means of adjustment of the devices known in itself, particularly of the outlet orifice, or of the scraping device, by adjustment of the speed, the quantity of adhesive substance, or the degree of moisture of the adhesive solution, and the quantity of the pigment coating may be regulated, and thus the pigmented bandage may be produced ready for immediate winding.

But the pigment or the filler may also be applied by spraying in powder form or by any other suitable means to the bandage coated with polyvinyl acetate, whilst still sticky. The required stickiness may also be effected subsequently, for instance by heating.

By means of a coating of particularly hydrophile substances e. g. low-viscous polyvinyl acetate or polyvinyl alcohol even over the finished coat, the durability etc. of the finished gypsum bandage, and particularly its resistance against tropical climates may be influenced favorably without the softening process being interfered with when used, subject to the coating being applied in a suitable manner, a film-like coating being advantageous.

Instead of gypsum as a pigment, as dealt with here by way of example, other pigments such as magnesia, infusorial earth, asbestos flour and others may be used.

If it is intended to increase the stiffness, the quantity of polyvinyl bodies or adhesive substance may be increased. If a bandage material is required that sets quickly, e. g. to fix corsets, the quantity of adhesive substance and pigment such as, magnesia, is increased accordingly and, if desired, the bandage may be softened in a quickly evaporating organic solvent or softening agent such as ether, alcohol, dichlorethylene, chloroform or like suitable solvents.

The described manufacture of the bandage materials also enables the incorporation of therapeutically active additions with a graduation of the action such as has not been previously attained. The special possibility of modification results from the fact that the medicaments may either be incorporated in the adhesive substance or in the pigment, and that by a corresponding modification of the adhesive substance the conditions of penetration may be adapted exactly to the purpose in view.

Other modifications may be made within the scope of the accompanying claims.

We claim:

1. Improvements in the manufacture of stiffening bandages characterized by combining with bandages of any kind at least one polyvinyl compound which is insoluble in water but is satisfactorily soluble in organic solvents and which is selected from the group consisting of the derivatives of polymerized vinyl alcohol and the polymerized vinyl derivatives of the aromatic hydrocarbons and adding at least one member selected from the group of substances modifying the flexibility and the swelling power of said water-insoluble polymerized vinyl compounds and consisting of hydrophilic polymerized vinyl compounds, polymerized acrylic and methacrylic acid and derivatives of such acids, and compounds of the class of caoutchouc, cellulose derivatives and softeners.

2. Improvements in the manufacture of stiffening bandages characterized by combining with bandages of any kind water insoluble polymerized vinyl acetate adding at least one member selected from the group of substances modifying the flexibility and the swelling power of said water-insoluble polymerized vinyl compounds consisting of hydrophilic polymerized vinyl compounds, polymerized acrylic and methacrylic acid and derivatives of such acids, cellulose derivatives and softeners.

3. Improvements in the manufacture of stiffening bandages characterized by combining with bandages of any kind at least one polyvinyl compound which is insoluble in water but is satisfactorily soluble in organic solvents and which is selected from the group consisting of the derivatives of polymerized vinyl alcohol and the polymerized vinyl derivatives of the aromatic hydrocarbons, adding at least one member selected from the group of substances modifying the flexibility and the swelling power of said water-insoluble polymerized vinyl compounds and consisting of hydrophilic polymerized vinyl compounds, polymerized acrylic and methacrylic acid and derivatives of such acids, and compounds of the class of caoutchouc, cellulose derivatives and softeners, and coating the thus prepared bandage with a hydrophilic substance.

4. Stiffening bandages containing at least one polyvinyl compound which is insoluble in water but is satisfactorily soluble in organic solvents and which is selected from the group consisting of the derivatives of polymerized vinyl alcohol and the polymerized vinyl derivatives of the aromatic hydrocarbons and an addition of at least one member selected from the group of substances modifying the flexibility and the swelling power of said water-insoluble polymerized vinyl compound and consisting of hydrophilic polymerized vinyl compounds, polymerized acrylic and methacrylic acid and derivatives of such acids, cellulose derivatives and softeners.

WILLY O. HERRMANN.
BERND BRAUN.